3,158,633
PROCESS FOR PREPARATION OF VINYL ESTERS
William S. Port, Lawrence, Mass., and Harry A. Monroe, Jr., Philadelphia, Pa., assignors to the United States of America as represented by the Secretary of Agriculture
No Drawing. Filed July 2, 1962, Ser. No. 207,480
13 Claims. (Cl. 260—410.9)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of vinyl esters. Vinyl esters of carboxylic acids are commonly prepared by an ester interchange reaction in which vinyl acetate and the carboxylic acid are reacted in the presence of a mercuric salt and of a strong acid, such as sulfuric acid, to produce the vinyl ester of the carboxylic acid. Under reaction conditions of this system there are side reactions which result in the formation of ethylidene derivatives and of carboxylic anhydrides. Such competing reactions are undesirable, because they reduce the yield of desired product and may complicate purification of the product. A reduction in reaction temperature from reflux to room temperature brings about an increased yield of the desired product, but the process now becomes impractical because nearly three days time is required to complete the reaction.

An object of the present invention is to provide an improved process for the preparation of vinyl esters, particularly the vinyl esters of saturated aliphatic carboxylic acids. Another object is to provide a process for the preparation of vinyl esters in which process the competing reaction to form the carboxylic anhydride is prevented or minimized. Other objectives and a more complete understanding of the invention may be had by referring to the following description and claims.

According to the present invention a saturated aliphatic carboxylic acid and at least an equimolar amount of vinyl acetate are heated in the presence of a mercuric salt such as mercuric acetate and of about from 0.5 to 2.0%, based on weight of the carboxylic acid, of an alkanesulfonic acid to produce the vinyl ester of the carboxylic acid with substantially no formation of carboxylic anhydride and the vinyl ester product separated from the reaction mixture.

Whereas sulfuric acid or an arylsulfonic acid produces a considerable amount of anhydride of the carboxylic acid and results in a lower yield of vinyl ester, we have discovered that an alkanesulfonic acid promotes the ester interchange reaction to give high yields of the vinyl ester yet does not cause the formation of the anhydride of the carboxylic acid under preferred conditions.

Among the alkanesulfonic acids which may be employed are methanesulfonic acid, ethanesulfonic acid, tetradecanesulfonic acid, and the like. Methanesulfonic acid is preferred because infrared analysis could detect no carboxylic anhydride in the product. Good yields of the desired product are obtained when the amount of alkanesulfonic acid added to the reaction mixture is in the range of about from 0.5 to 2.0%, based on the weight of the carboxylic acid.

While the ester interchange reaction proceeds when the vinyl acetate and the carboxylic acid are combined in equimolar amounts, an excess of vinyl acetate enhances the yield of the new ester. A ratio of about 6 moles of vinyl acetate per mole of carboxylic acid is preferred.

A convenient and desirable temperature range for conducting the reaction is that of the reflux temperature of the mixture; in the range of about 75 to 85° C. The reaction proceeds at lower temperatures, but at a slower rate.

Yields up to about 80% of the desired ester were present in the crude products obtained by cooling the reaction mixture, adding sufficient sodium acetate to neutralize the strong acid, filtering to remove solids, and distilling the filtrate to separate vinyl acetate from the vinyl ester product. Conventional purification procedures may be applied to obtain vinyl esters of higher purity, but this is not considered necessary for the purpose of the present invention or for many uses of the vinyl esters.

Examples 1 and 2 are included for comparative purposes to demonstrate the occurrence of side reactions, especially the formation of anhydrides, in previously disclosed processes.

*Example 1*

Preparation of vinyl palmitate using sulfuric acid as a catalyst.—Mercuric acetate 0.28 g., was dissolved in 25 ml. of vinyl acetate, 0.025 ml. 100% sulfuric acid mixed into the solution, and the mixture combined with 13.5 g. palmitic acid in a round bottom flask equipped with a reflux condenser. The contents of the flask were warmed to effect solution, then refluxed (about 80° C.) in a nitrogen atmosphere for 2 hours. The solution was cooled and 0.2 g. sodium acetate was added. The mixture was allowed to stand for about an hour and then filtered. The filtrate was distilled under reduced pressure to a pot temperature of 90° C. to remove unused vinyl acetate. The crude product weighed 13.38 g. and its iodine number of 35.3 corresponds to a yield of 40.9%. An infrared spectrum of the product contained a significant anhydride carbonyl peak at 1800 cm.$^{-1}$ in addition to the vinyl ester carbonyl at 1750 cm.$^{-1}$.

*Example 2*

Preparation of vinyl palmitate using p-toluenesulfonic acid as a catalyst.—The procedure of Example 1 was repeated except that 0.146 g. of p-toluenesulfonic acid was substituted for the sulfuric acid. The yield of product was 13.4 g. and its iodine number was 30.3, corresponding to a yield of 35.3%. The infrared spectrum of the product was similar to that obtained for the product of Example 1, having a substantial anhydride peak at 1800 cm.$^{-1}$.

The results of the foregoing examples show that when sulfuric acid or p-toluenesulfonic acid is used as a catalyst in the ester interchange reaction the relatively poor yield of desired reaction product is accompanied by appreciable amounts of the anhydride of the carboxylic acid.

The following examples are presented in illustration of but are not intended to be in limitation of the process of the present invention.

*Example 3*

Preparation of vinyl palmitate using methanesulfonic acid as a catalyst.—The procedure of Example 1 was repeated except that 0.05 ml. of methanesulfonic acid was substituted for the sulfuric acid. The yield of vinyl palmitate was 14.8 g. The iodine number of the product was 65.0, which corresponds to a 75.1% yield. The infrared spectrum of the product was conspicuous for the absence of absorption in the 1800 cm.$^{-1}$ region, showing that the product was essentially free of anhydride.

*Example 4*

Preparation of vinyl stearate using ethanesulfonic acid as a catalyst.—The general procedure of the preceding examples was repeated using 14.5 g. of stearic acid for the carboxylic acid and a catalytic system of 0.28 g. mercuric acetate and 0.057 ml. ethanesulfonic acid. After removal of the unreacted vinyl acetate there was obtained 15.2 g. of product having an iodine number of 61.4, corresponding to a 78% yield of vinyl stearate. An infrared spectrum of the product shows substantially no absorption in the anhydride carbonyl region.

*Example 5*

*Preparation of vinyl stearate using tetradecanesulfonic acid as a catalyst.*—The procedure of Example 4 was repeated except that 0.214 g. of tetradecanesulfonic acid was substituted for the ethanesulfonic acid. The product, weighing 12.9 g., had an iodine number of 47.6, corresponding to a yield of 61.6%. A weak peak at 1800 cm.$^{-1}$ of the infrared spectrum of this product shows a slight amount of anhydride present as an impurity.

*Example 6*

*Preparation of vinyl formate using methanesulfonic acid as a catalyst.*—A solution of 1.4 g. mercuric acetate in 107.5 g. vinyl acetate was combined with 0.5 ml. methanesulfonic acid and the combined solution added to 47.4 g. of 97% formic acid. Vinyl formate was obtained by distillation, using a two foot extruded packing column and collecting the fraction boiling at 37 to 46° C. at 749 mm. The yield of product was 40.0 g., or 55.5%. Although the product is crude vinyl formate, the infrared spectrum showed the product to be an ester essentially free of anhydride.

These examples demonstrate that the use of an alkanesulfonic acid instead of sulfuric acid or an aromatic sulfonic acid in the catalyst system in the ester interchange reaction to produce vinyl esters of carboxylic acids may double the yield of the desired product. The competing reaction to form the carboxylic anhydride is prevented or minimized in the process of the present invention.

We claim:

1. A process for preparing a vinyl ester comprising heating a saturated aliphatic carboxylic acid and at least an equimolar amount of vinyl acetate in the presence of mercuric acetate and of about from 0.5 to 2%, based on weight of carboxylic acid, of an alkanesulfonic acid to produce the vinyl ester of said carboxylic acid, and separating said vinyl ester from the reaction mixture.

2. The process of claim 1 in which the alkanesulfonic acid is methanesulfonic acid.

3. The process of claim 2 in which the saturated aliphatic carboxylic acid is stearic acid.

4. The process of claim 2 in which the saturated aliphatic carboxylic acid is palmitic acid.

5. The process of claim 2 in which the saturated aliphatic carboxylic acid is formic acid.

6. The process of claim 1 in which the alkanesulfonic acid is ethanesulfonic acid.

7. The process of claim 6 in which the saturated aliphatic carboxylic acid is stearic acid.

8. The process of claim 6 in which the saturated aliphatic carboxylic acid is palmitic acid.

9. The process of claim 6 in which the saturated aliphatic carboxylic acid is formic acid.

10. The process of claim 1 in which the alkane sulfonic acid is tetradecane sulfonic acid.

11. The process of claim 10 in which the saturated aliphatic carboxylic acid is stearic acid.

12. The process of claim 10 in which the saturated aliphatic carboxylic acid is palmitic acid.

13. The process of claim 10 in which the saturated aliphatic carboxylic acid is formic acid.

References Cited in the file of this patent

UNITED STATES PATENTS

| | | |
|---|---|---|
| 2,646,437 | Dickey et al. | July 21, 1953 |
| 2,997,495 | Rutledge et al. | Aug. 22, 1961 |